United States Patent
Lavi

(10) Patent No.: US 12,539,202 B2
(45) Date of Patent: Feb. 3, 2026

(54) PRECISION DENTAL IMPLANT SYSTEM

(71) Applicant: Abraham Lavi, Delray Beach, FL (US)

(72) Inventor: Abraham Lavi, Delray Beach, FL (US)

( * ) Notice: Subject to any disclaimer, the term of this patent is extended or adjusted under 35 U.S.C. 154(b) by 0 days.

(21) Appl. No.: 17/331,824

(22) Filed: May 27, 2021

(65) Prior Publication Data

US 2021/0369418 A1 Dec. 2, 2021

Related U.S. Application Data

(60) Provisional application No. 63/031,062, filed on May 28, 2020.

(51) Int. Cl.
*A61C 8/00* (2006.01)

(52) U.S. Cl.
CPC .......... *A61C 8/0039* (2013.01); *A61C 8/0022* (2013.01)

(58) Field of Classification Search
CPC ... A61C 8/0039; A61C 8/0022; A61C 8/0037; A61C 8/0018; A61C 8/00; A61C 8/0082; A61C 8/0084; A61C 8/0089; A61C 8/0048; A61C 8/0007; A61C 8/005; A61C 8/0068; A61C 8/0074; A61C 8/0054; A61C 8/0086; A61C 8/0012; A61C 1/084; A61B 17/8605; A61B 2017/00022; A61B 2017/00734; A61N 1/326; A61N 1/205; A61N 2/02
USPC ...................................... 433/174–176, 201.1
See application file for complete search history.

(56) References Cited

U.S. PATENT DOCUMENTS

| | | | |
|---|---|---|---|
| 8,374,697 B2 | 2/2013 | Berger | |
| 9,039,414 B2 | 5/2015 | Bulloch | |
| 9,149,342 B2 | 10/2015 | Tedesco | |
| 9,522,053 B2 | 12/2016 | Vukas | |
| 11,273,043 B1* | 3/2022 | Abbasi | A61B 17/1757 |
| 2007/0173954 A1* | 7/2007 | Lavi | A61B 17/562 623/908 |
| 2009/0291414 A1* | 11/2009 | Wang | A61C 8/005 433/174 |
| 2017/0165036 A1* | 6/2017 | Ceausu | A61C 8/0042 |

FOREIGN PATENT DOCUMENTS

WO   WO-2018225057 A1 * 12/2018 ............ A61M 27/00

OTHER PUBLICATIONS

Li et al., A Dental Implant System Of The Forward Strut Bolt Locking And Retrieval Mechanism, CN 109963511 A, Machine translation (Year: 2019).*

* cited by examiner

*Primary Examiner* — Eric J Rosen
*Assistant Examiner* — Mirayda A Aponte
(74) *Attorney, Agent, or Firm* — Barbara E. Johnson, Esq.

(57) ABSTRACT

The present dental implant, whether tapered or cylindrical, is cannulated, to allow placement over a slender post pre-embedded into the host bone. The post is a rigid, not a flexible, construct that can be placed accurately, as to position and angle, in the jawbone. With the post in the correct position, the implant is then installed directly over the temporarily anchored post, and after tightening of the implant by rotation the post is removed.

7 Claims, 11 Drawing Sheets

PRECISION DENTAL IMPLANT SYSTEM

CROSS-REFERENCE TO RELATED APPLICATION AND FIELD OF THE INVENTION

This patent application claims priority to, and incorporates herein by reference, U.S. Provisional Patent Application No. 63/031,062 filed 28 May 2020. The invention pertains to new methods, and hardware, to place dental implants in their correct position—an elusive goal until now.

BACKGROUND OF THE INVENTION

Dental implants have undoubtedly been a game-changer in prosthodontics. A surgically implanted post, that can be crowned or otherwise anchored to oral prosthetics, is clearly the best way to anchor corrective hardware in the mouth. According to the Mayo Clinic, dental implants are the mechanical equivalent of restored tooth roots, and because the titanium in the implant fuses with the jawbone, the implant does not slip, make noise or cause bone damage in the way fixed bridgework or dentures might. Moreover, the dental implant materials cannot decay as one's natural teeth might, in the support of traditional bridge work. Dental implants can be a good option for individuals who have one or more missing teeth, have experienced full jawbone growth, have adequate bone to secure the implant (or are a candidate for a bone graft), have healthy oral tissues, do not have contraindicating underlying health conditions, and are willing to commit to a multi-step process over time.

Interestingly, the aspect of dental implants not openly talked about—or certainly not widely admitted in the profession—is how difficult they are to install in the correct position and at the proper angle. An improperly placed dental implant—wrong spot, wrong orientation—will require sacrifice of adjacent healthy teeth (or portions thereof) to create adequate clearance "to rotate in" a crown or other prosthesis atop the implant after it has healed and been finished with a cooperating abutment. Recipients of improperly installed dental implants typically never proceed to the crown or prosthesis finishing procedure, especially if the implant is not in the front of the mouth and does not show when smiling, because the need to sacrifice healthy surrounding tooth tissue "is just too great a price to pay" to finish the desired prosthetic. Also, when multiple implants are installed for the purpose of supporting bridgework or other bridges or dentures, it goes without saying that any one or more misplaced or misaligned implants create enormous mechanical obstacles—not to mention additional pain and expense—in rectifying the whole installation of the new mouth hardware.

Why do dental implants so often end up misplaced or crooked? The answer has to do with the installation protocols widely in use heretofore, and that the doctor has always had to rely on a visual/manual placement of the implant that starts right at the drilling procedure into the bone. If the practitioner angles the drill even slightly in the wrong orientation and a traditional dental implant is then simply screwed into the drilled hole, the dental implant positioning is doomed to be wrong from the very beginning in a statistically predictably number of cases. There simply haven't been systems or technology available to enable the oral surgeon to start or to control the drilling in the correct direction—and this is true for the most expert practitioners as well as the beginners—because simple hand control of the drill in the mouth does not allow it. The fault in the dental implant technology has not been with the implants themselves nor with the practitioners—but with the absence of technology to aid in the implantation procedure accurately so as to avoid failed placements. Accordingly, a need remains for a dental implant placement technology—a thorough overhaul to current dental implant practice—that makes it possible to orient 100% of dental implants into the correct and desired position every time.

BRIEF DESCRIPTION OF THE INVENTION

In order to meet this need, the present technology embraces the hardware—and methods—to provide a prosthodontist or oral surgeon with the necessary tools and components for foolproof dental implants. The new technology is not a simple improvement in dental implants but is a fundamental overhaul of the dental implant hardware and procedures, compared to those in use prior to this invention. First of all, the dental implant components proposed in this invention are cannulated, to allow placement over a temporary post secured to the jawbone The post is a rigid, not a flexible, construct, positioned in the exact alignment for which the implant is intended. This post performs multiple functions. It enables the surgeon to explore the optimum location and angulation of the implant. It "stakes" the bone area where the implant should be inserted for the duration of the procedure. Because part of the post protrudes above the gingiva, it allows the utilization of a (cannulated) mock crown to predict final alignment of prosthesis with the adjacent teeth. The post functions as both a pilot hole drill and "temporary" implant before drilling the jawbone. It is made of hardened material to drill its own path just like a conventional bone drill. Its distal end is partially threaded so that it screws to the bone. Similarly, the post also allows the surgeon to achieve the desired orientation and position of an implant destined for a bridge or denture, which usually still requires alignment with the existing adjacent teeth. Finally, the post defines the path for the permanent implant. Henceforth in this document, we refer to the post as "PIE," which refers to Position Implant Explorer.

If the PIE position is unsatisfactory on the first trial, it can be removed and re-oriented properly. The PIE diameter is ⅓-⅕ the implant diameter. A conventional drill bit simply cannot reliably be positioned with a greater accuracy than it can be positioned with a PIE. With PIE in the correct position (location and angle), the dental implant is then accurately installed, and secured into the bone, directly over the temporarily anchored PIE. After the dental implant is in position in the bone, the PIE is removed. The relative diameter of cannulation of the components is within limits that do not sacrifice the load-bearing capacity or the expected life span of the implant. As a safety precaution, this invention encompasses a set screw design, illustrated in FIG. 5b, to back fill the cannulation of the implant. For each implant size, the corresponding diameter of its PIE and the diameter of its cannulation are very close, allowing the cannulated implant to slide over the PIE with just enough space for easy movement but not enough space to allow misalignment of the cooperating structures. In patients with highly dense bone, current practice calls for the drilling of the jawbone before inserting the implant. In the Precision Dental Implant System (PDIS), the use of a cannulated drill is necessary to pre-drill the bone before implanting. The drill must be cannulated because it must slide over the PIE which define both the position and angulation for the cannulated drill. If the bone is not particularly dense, the implant is self-drilling and is always self-tapping. Constrained by the PEI, the permanent implant drills its own path. The surgeon assesses the density of the presented bone when inserting PIE. Only when the practitioner assesses that the bone is especially hard is over-drilling, with a cannulated drill, performed—as a matter of discretion.

DETAILED DESCRIPTION OF THE INVENTION

The Precision Dental Implant System, PDIS, consists of 1) cannulated permanent implants, cylindrical or tapered, provided in different diameters and lengths conforming to the anatomy of the host bone; 2) PIEs of different diameters and lengths specific to each implant diameter and length; 3) cannulated cylindrical and conical drills of different diameters and lengths specific to each implant diameter and length; 4) temporary and permanent abutment of different shapes, diameters and length matching each permanent implant; 5) fasteners to attach the abutments to the permanent implants, and 6) tools to drive the drills, screwdrivers to drive the implants, wrenches for manual removal of the PIEs and wrenches for the fasteners. The present implants are cannulated, to allow placement over the PIE. The Position Implant Explorer, or PIE, is a rigid, not a flexible, construct. Once implanted, it ensures that the implant itself will have the same orientation of the PIE in the exact alignment for which the implant is intended. State-of-the-art dental implants are solid, and non-cannulated. Implanting a solid dental implant necessitates the use of a solid drill to pre-drill the jawbone to a minor diameter of the implant. An error in the position or angulation of the drill compromises the quality of the outcome. The dental surgeon has one shot to get it right the first time. Once the jawbone has been drilled for a particular size implant, it is next to impossible to secure the implant in the desired position and orientation. On the other hand, if the PIE position or orientation is unsatisfactory, another try is possible because the hole made in the jawbone by PIE is substantially smaller than the subsequent hole made by the drill. Thus, the cannulated implant provides better accuracy because of PIE and the ability of the practitioner to position it colinearly with the adjacent teeth—or normal to a cooperating bridge or other dental structure. A conventional drill bit cannot be positioned with the same accuracy as the PIE can be. With PIE in the correct (temporarily anchored) position, the dental implant is then installed in the bone directly over PIE, and after the implant has been rotationally secured in the jawbone via its cutting threads and self-tapping insertion, PIE is removed. The diameter of the cannulation of the implant is within limits that do not sacrifice the load-bearing capacity or the expected life span of the implant. As an added precaution, this disclosure offers a mechanism through the elongated set screw of FIG. 5b to recapture most of the shear and bending strength caused by the cannulation.

Figure 16:
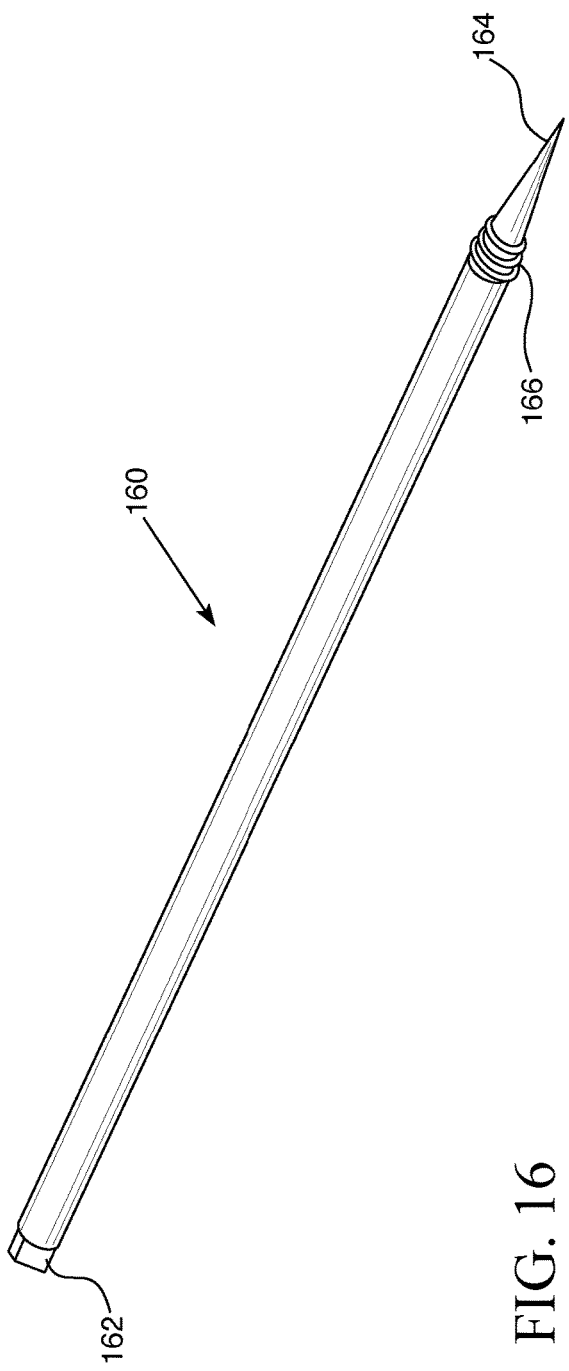
FIG. 16 is a perspective view of the basic PIE of the present invention.

Referring now to FIG. 16, the Position implant Explorer, PIE, of the present invention is shown in perspective view. The PIE 160 is a rigid construct. Like many conventional dental drills, it features a flat head 162, so that a flat-head mating tool (not shown) can engage it and drive it during the insertion. It is within the skill of the art that the proximal end of a PIE that engages a driver tool must be shaped to allow secure engagement and also to facilitate rotation at the same time. Furthermore, once driven into bone and positioned, the driver releases the PIE according to the skill in the art, leaving it secured to the bone for subsequent steps—checking orientation using a mock dental crown, drilling via a cannulated drill and implanting the permanent dental implant. It is also necessary for the PIE driving tool to be able to retrieve PIE, once the permanent implant is seated. These requirements need cooperative driving devices and PIE ends, all well within the ordinary skill of the art. The PIE 160 possesses cutting tip 164 with adjacent cutting tip threads 166. The tip may be fashioned as a trocar, twist drill, or bayonet to drill efficiently. The tip is also partially threaded to secure it to the bone for the duration of the dental procedure. The PIE 160 is not large in diameter—measured in millimeters (1.0 to 1.8 mm)—and is uniform in diameter up to the distal end where the threads 166 are, and further distally from the threads 166 the PIE tapers to a sharp point (shown), or incorporates a twist drill or bayonet blade end, which constitutes the cutting tip 164. In practice, the practitioner anchors PIE 160 in the bone where the implant is intended. PIE drills its own path within the bone and the threaded tip secures it to the jawbone for the subsequent steps of the implanting procedure. Once the position and orientation angle of PIE are deemed satisfactory, the practitioner has the option to introduce the implant proper or to drill the jawbone using a cannulated drill over PIE. The current state of the art of dental implants requires drilling a hole with a diameter equal to the minor diameter of the thread implant. This hole drilled in the jawbone is three or four times larger than the "pilot" hole drilled by PIE described in this invention. Once the jawbone is drilled and the implanting hole is established, the surgeon has no choice but to insert an implant even when the surgeon realizes the inaccuracy of the hole position and the angulation. The bone drilling process is irreversible. If the inaccuracy is significant, the intended implant size will prove inadequate because the subsequent addition of the abutment and the final crown cannot overcome the errors in positioning and angulation. Often, the surgeon is forced to introduce a larger diameter implant in the hole presented while aiming to correct the perceived inaccuracy in position and angulation. In short, it is not possible to wield a drill to prepare for an implant without introducing inaccuracy in the drilling position and direction (hence the need for this invention). Fortunately, this invention allows the surgeon to avoid much of the inaccuracy detailed above before committing to drilling the jawbone: The pilot hole drilled by PIE is exploratory and will always be smaller than ⅓ the diameter necessary to introduce the implant. The introduction of cannulation eliminates most of the potential misalignment. PIE can easily be repositioned by hand for better alignment. After PIE is securely positioned at the implant site, it is rotated and secured (albeit temporarily) to the bone, via the cutting tip threads 166, which temporarily engage the drilled bone where the implant is to be affixed.

Figure 1:
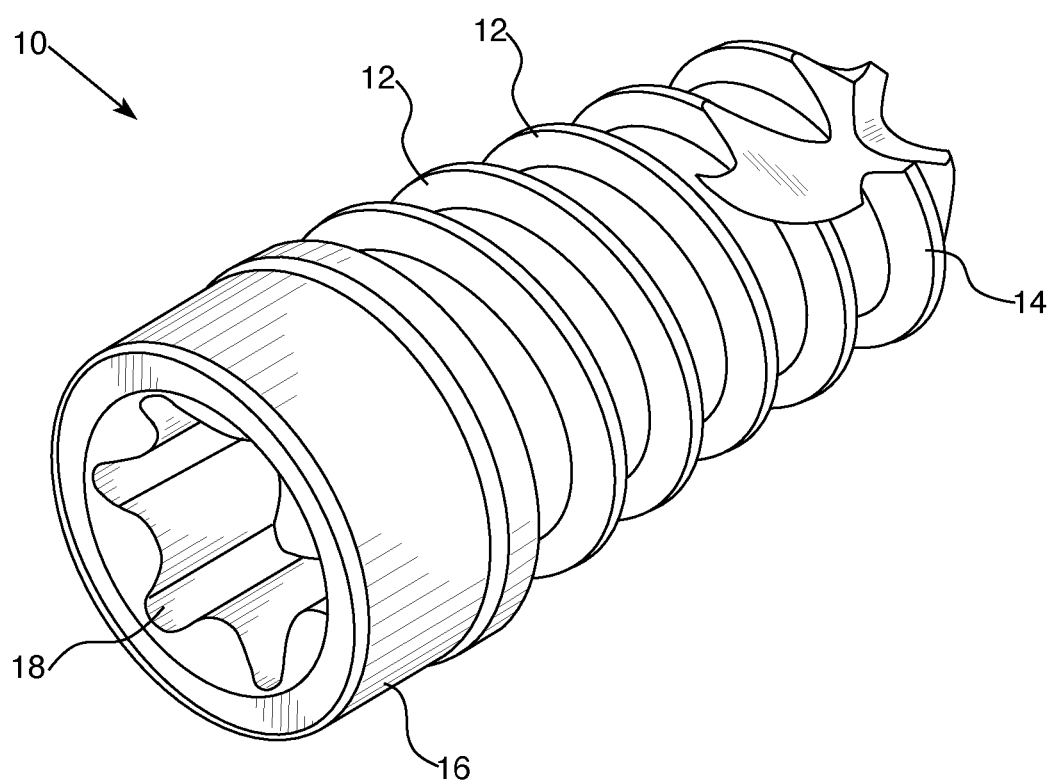
FIG. 1 is a perspective view of a main body of a tapered dental implant, with constant difference between outer and inner thread diameter as well as cutting threads at its distal tip.
Figure 2:
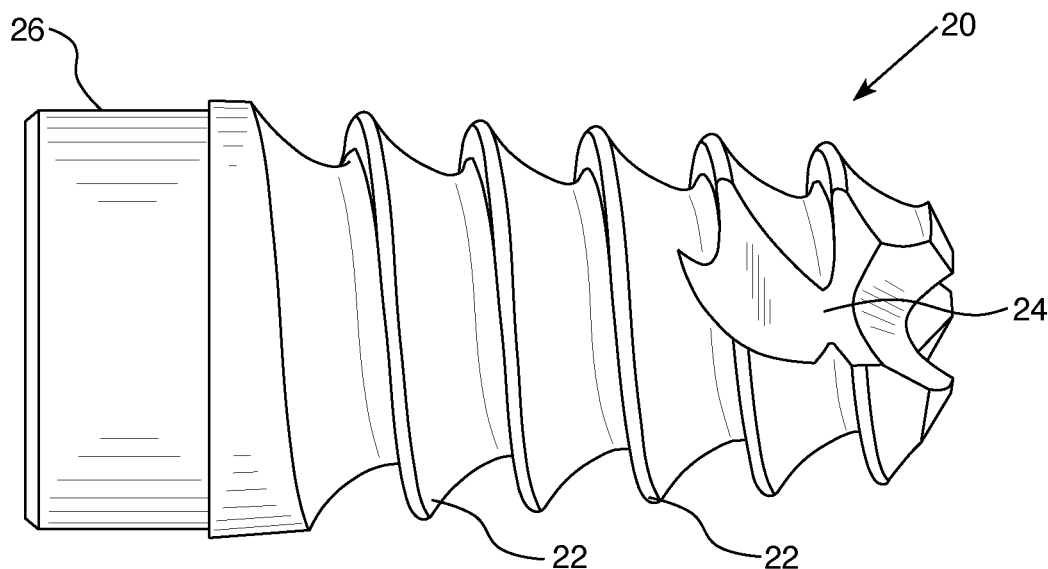
FIG. 2 is a side elevation of an implant.

Referring now to FIG. 1, the present dental implant 10 bears cutting threads 12 thereon, with a chamfer 14 in said cutting threads. The end of the implant 10 opposite the cutting threads is a collar 16 having a collar recess 18. The collar recess has a geometric shape to which a rotating tool (not shown) can engage. Although not shown in FIG. 1, the implant 10 is cannulated (see for example FIGS. 3 and 4). Whereas FIG. 1 shows the implant in perspective view, FIG. 2 shows an implant in side-elevation, in which the implant 20, cutting threads 22, chamfer 24 and collar 26 are all visible.

Figure 3:
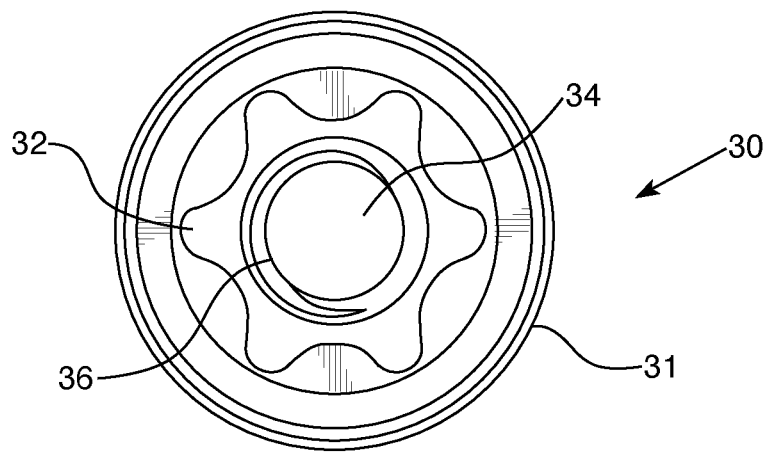
FIG. 3 is a coronal elevational view of an implant.
Figure 4:
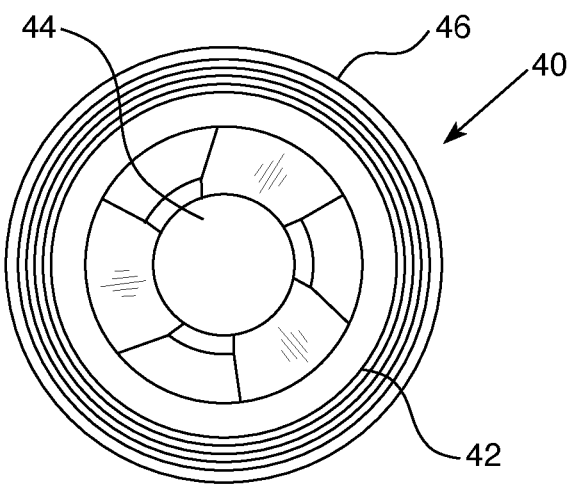
FIG. 4 is an apical elevational view of an implant—opposite end vis a vis FIG. 3.

FIGS. 3 and 4 are end elevational views of the implant 30 and 40, respectively, illustrating the collar 31, collar recess 32, implant cannulations 34 and 44, implant cannulation threads 36, cutting threads 46 and chamfer 42, The collar recess 32 is configured in a geometric pattern to allow insertion of a standard tightening/loosening tool (not shown). Ail cannulation dimensions in FIGS. 1-4 are cooperative with—that is, only slightly larger than—the diameter of the Position Implant Explorer, PIE, 160 of FIG. 16. The cannulation, and PIE, are central to the present invention. Theoretically, a practitioner could orient a drill as precisely as one could orient a PIE, but in practice—with PIE—there is "room" for a do-over, whereas with a drill there never is. In other words, if the practitioner makes a mistake with the drill, too much bone has already been sacrificed to allow re-positioning of the drilled area, but if one makes a mistake with the pilot hole of PIE, it can be repositioned without having sacrificed much adjacent bone at all. Of course, whether the implant is tapered or cylindrical requires either a corresponding tapered or cylindrical drill. Apart from precise drilling, the triple cutting tip on the implant itself is also very important—see for example FIG. 4, reference number 44. With the combination of the use of the PIE and the triple-cutting tip, exceptionally good results in correct "seating" of the implant can be accomplished.

Figure 5A:
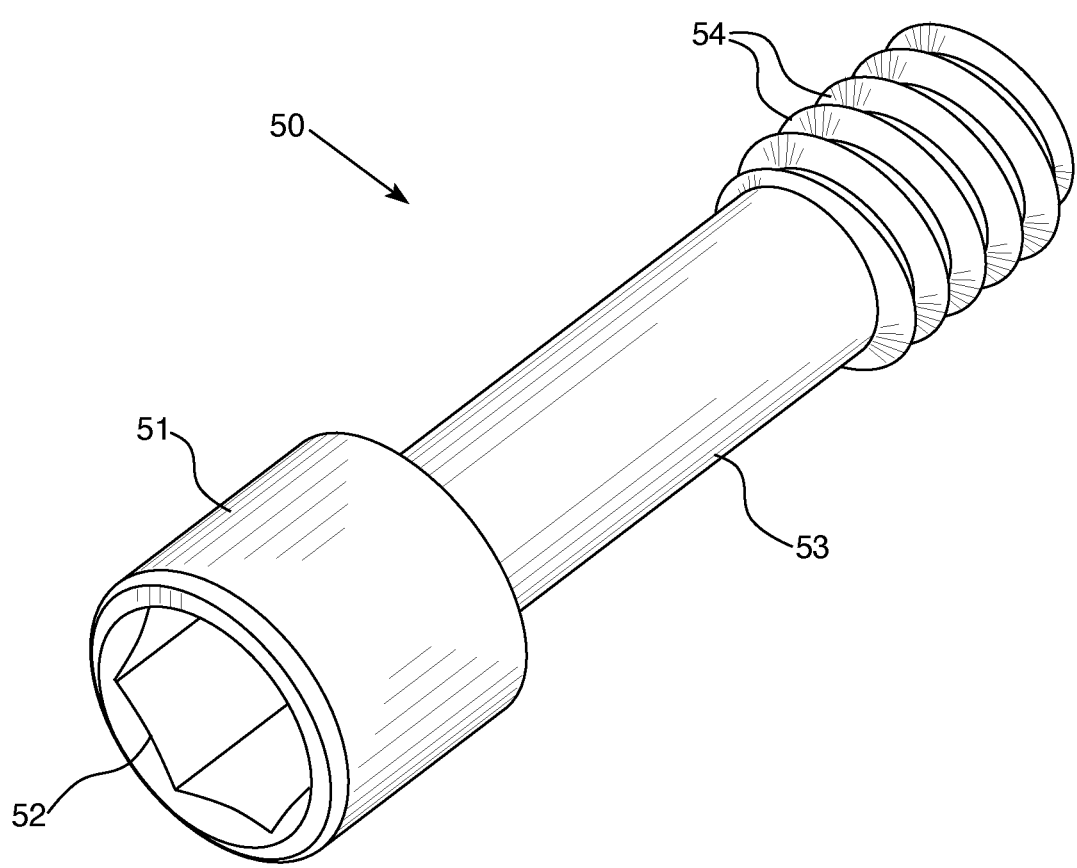
FIG. 5a is a perspective view of a set screw.
Figure 5B:
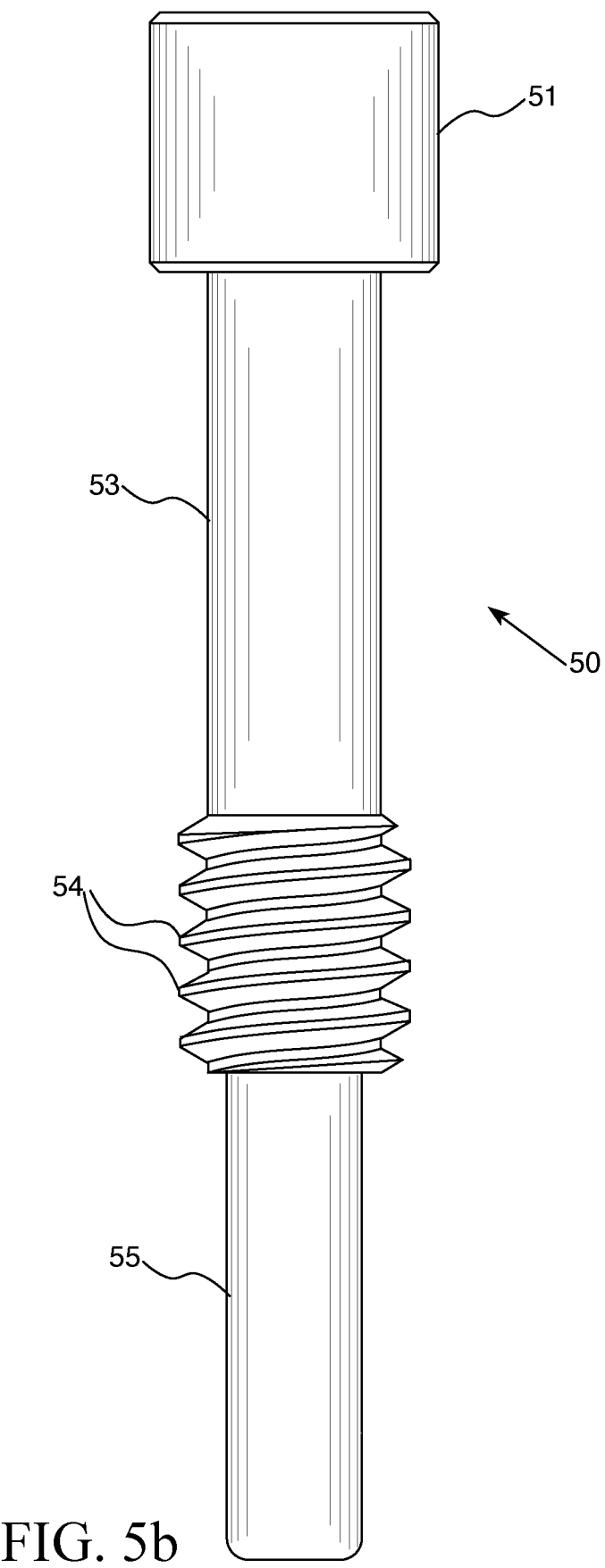
FIG. 5b is a plan view of an extended set screw similar to that of FIG. 5a but with an extender.
Figure 6:
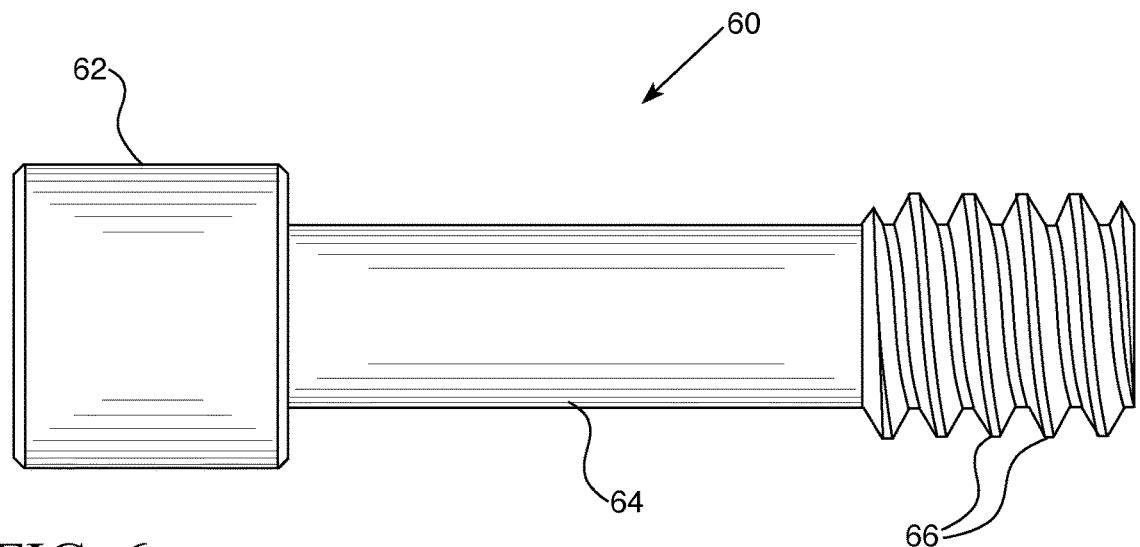
FIG. 6 is a side elevational view of a set screw.
Figure 7:
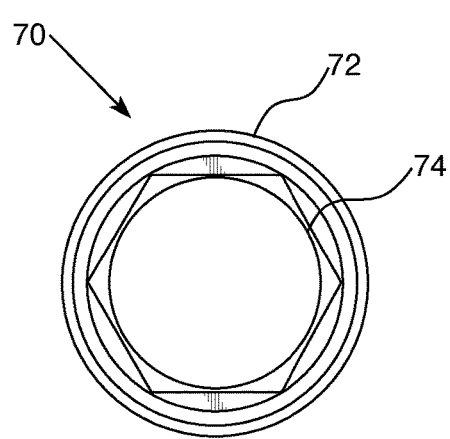
FIG. 7 is an end elevational view of a set screw.
Figure 8:
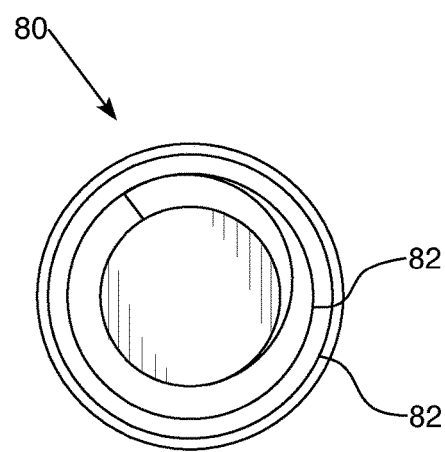
FIG. 8 is an end elevational view of a set screw—opposite end vis a vis FIG. 7.

Whereas the structures of FIGS. 1-4 are cannulated, the set screw 50 of FIGS. 5a and 5b is definitely not cannulated, but instead provides not only a securing function between the implant shown in FIGS. 1-4—and the present abutment of FIGS. 9-12—but also a monolithic (FIG. 5a) or "back fill" (FIG. 5b) function to restore de facto solidity to the implant through part or all of the implant cannulation. The set screw of FIG. 5a, which terminates at its distal threads 66, extends into the abutment only so far as to engage with the interior abutment anchor threads 116 (see FIG. 11), leaving the implant itself hollow in the area of its cannulation. The set screw of FIG. 5b, which contains the shaft 55, not only engages the interior abutment anchor threads 116 but also extends, via the set screw shaft extension 55, down into the implant cannulation to back fill the implant throughout its entire length. Set screws according to FIG. 5b may be pre-designed in lengths that match or coordinate with the various lengths of implants and abutments or may be adjusted to the ideal length by simple trimming during the implantation procedure. Accordingly, the set screw 50 of FIG. 5a bears a set screw head 51, a set screw head recess 52, a set screw shaft 53 and set screw threads 54. The set screw 50 of FIG. 5b bears the same set screw head 51, a set screw head recess 52, a set screw shaft 53 and set screw threads 54 and also the set screw shaft extension 55. FIGS. 6, 7 and 8 are side and end elevational views of the set screw which illustrate the set screws 60, 70 and 80 and their respective set screw heads 62 and 72, set screw shafts 64, and set screw threads 66, 74 and 82.

Once the Position implant Explorer, PIE, 160 of FIG. 16 is anchored, the patient is ready for the implantation procedure, albeit after pre-drilling with a cannulated drill if necessary. The patient would be ready for the implantation procedure, after the jawbone has been preliminarily drilled and PIE 160 of FIG. 16 is temporarily anchored in the bone as described above. Any one of the implants of FIGS. 1-4 is then threaded over PIE and gently pushed, sliding it along the path defined by PIE without disrupting the position or orientation of same, down into position adjacent the (drilled) bone site. Using an external tool, the implant is then further rotated into the bone, with the cutting threads and chamfer providing a self-drilling and self-tapping seating of the implant into the bone.

After the above implantation of the implant 10 of FIG. 1 (or any other cannulated implant disclosed herein) the PIE is then manually, or via a dental hand piece, rotated out of the bone, before the permanent abutment and crown can be added. At this point in the overall procedure, the implant has to be allowed to heal, integrate and anchor into the bone it has been placed within, so a period of a few to several weeks needs to elapse (as known in the art) before the additional components of the implant can be added. A customary temporary cap or abutment structure (not shown) is placed atop the implant in the mouth for this healing period. These temporary caps and abutments are known in the art and do not form part of the present invention.

After the necessary healing time has occurred and the prosthodontist or oral surgeon has confirmed that the implant is securely anchored in the jawbone of the patient, the remaining assembly of the abutment with the set screw can proceed. It is necessary to attach an abutment, FIG. 11, made from metal, polymeric or other material for the base of the prosthesis tooth. The set screw of FIG. 5 is used to fixate the abutment to the implant. However, the FIG. 5a design does not extend into the implant itself beyond a fraction of the implant length. The set screw of FIG. 5b possesses an extension "to plug" the cannulation. (This plugging action restores most or all of the strength and stability that is necessarily compromised—even if only slightly—by fashioning an implant with a cannulation in the first place.) Upon placement of the permanent abutment, a crown can be added.

Figure 9:
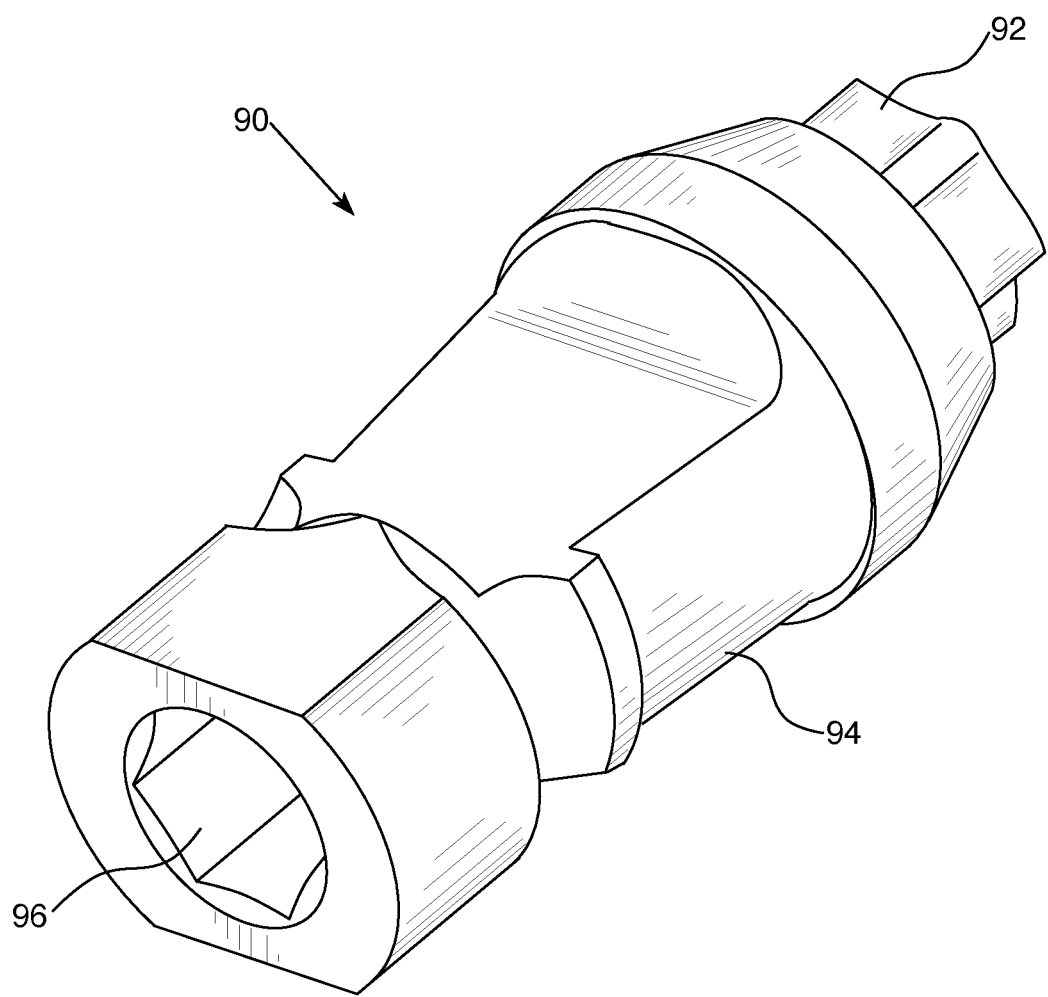
FIG. 9 is a perspective view of an abutment.
Figure 10:
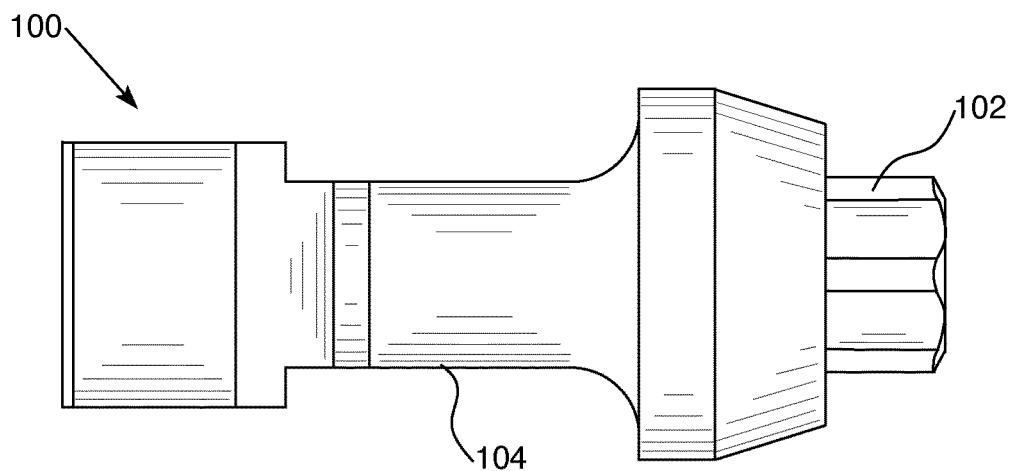
FIG. 10 is a side elevational view of an abutment.
Figure 11:
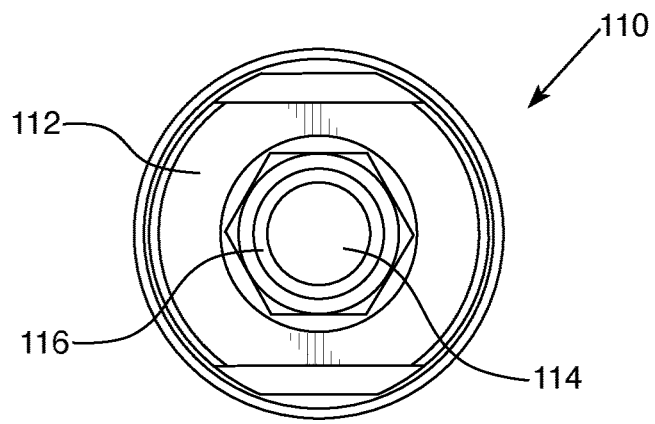
FIG. 11 is an end elevational view of an abutment.
Figure 12:
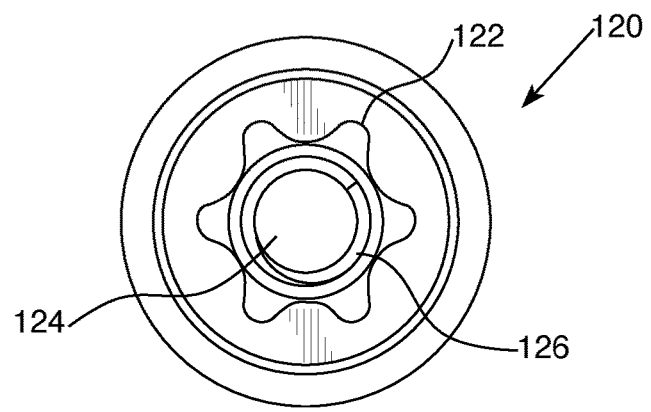
FIG. 12 is an end elevational view of an abutment—opposite end vis a vis FIG. 11.
Figure 13:
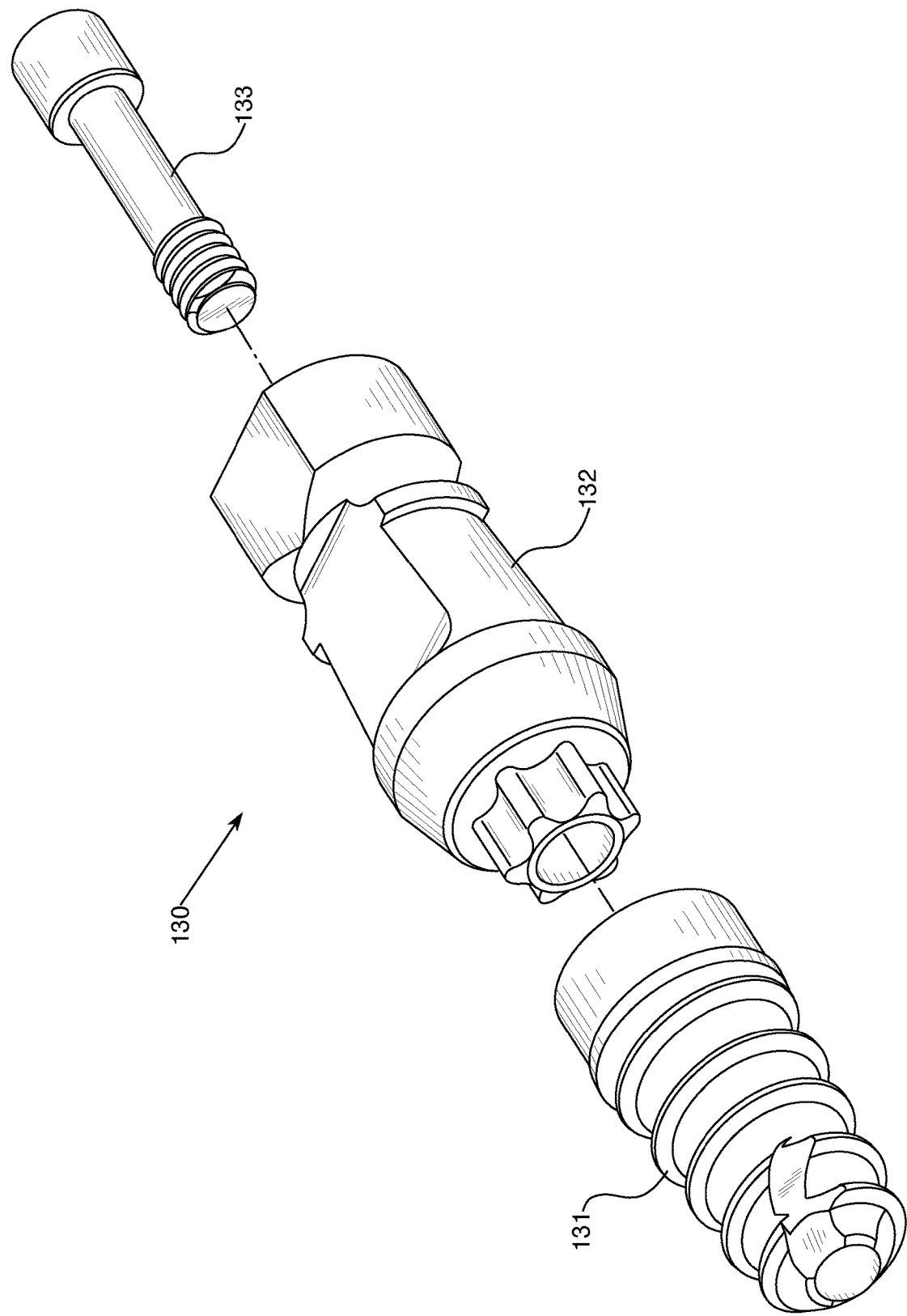
FIG. 13 is an exploded perspective view of the present dental implant abutment assembly.
Figure 14:
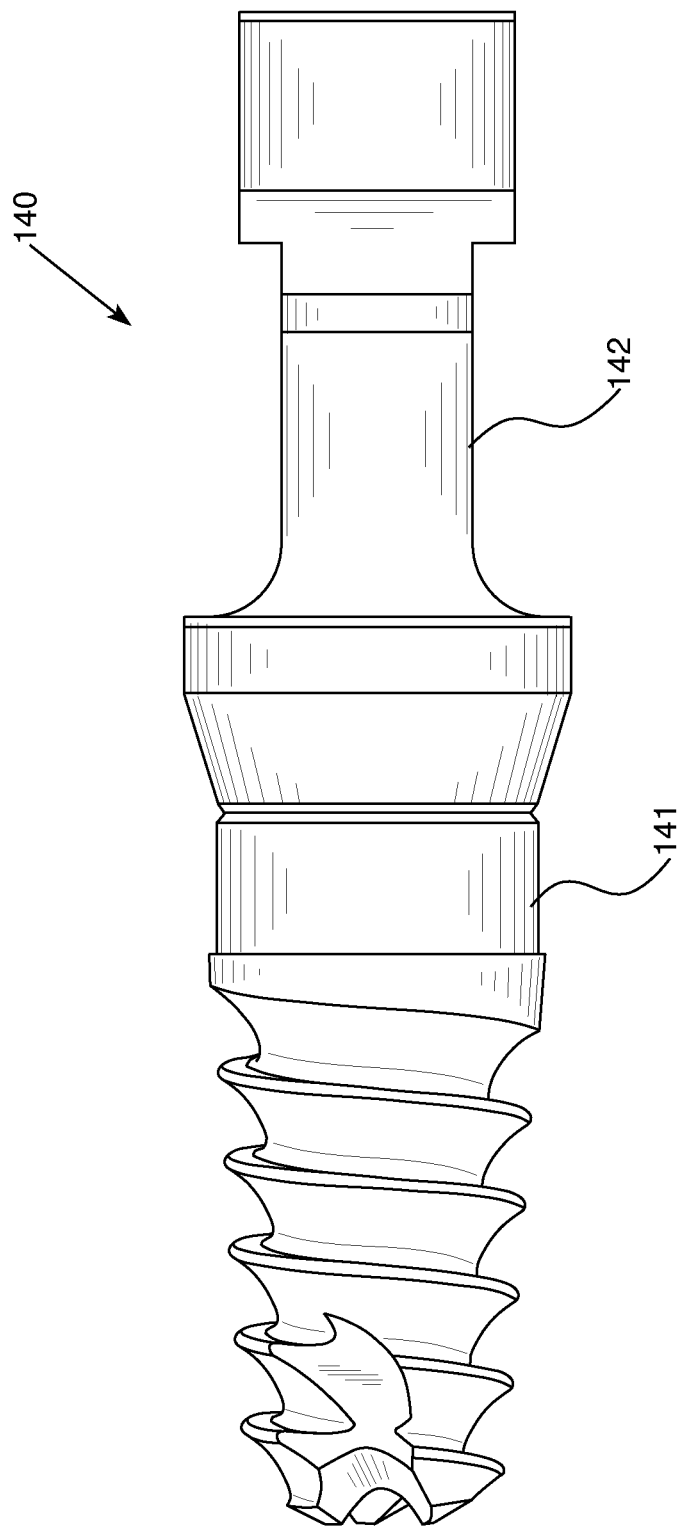
FIG. 14 is a plan view of the present assembled dental implant abutment assembly.
Figure 15:
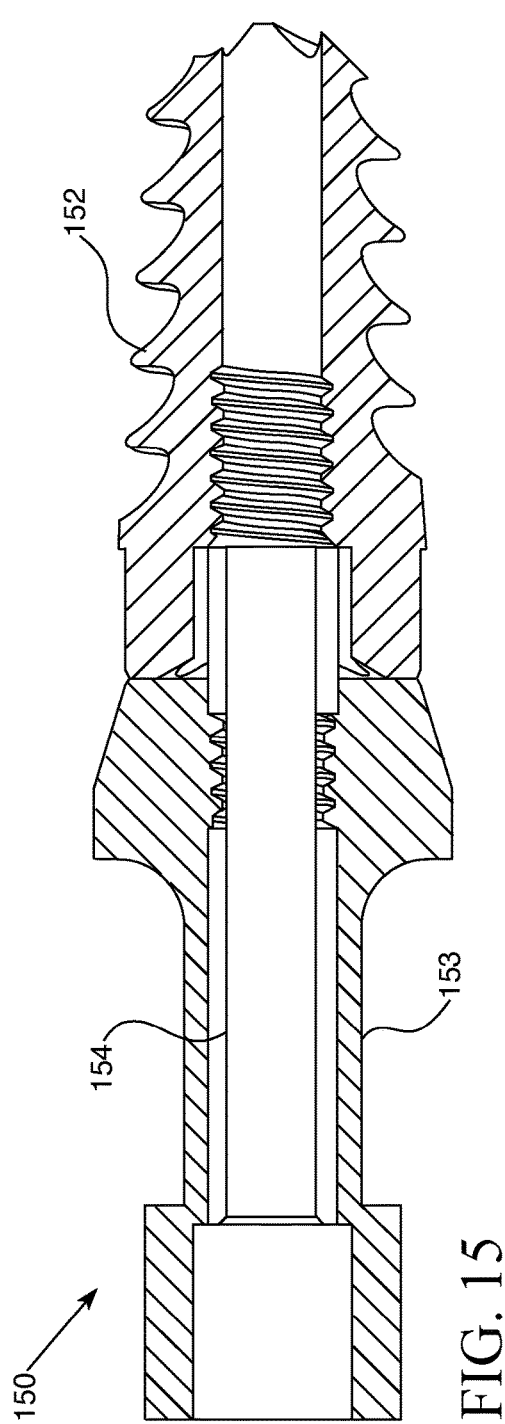
FIG. 15 is a sectional view of the present assembled dental implant abutment assembly.

Referring now to FIG. 9, an abutment 90 is shown in perspective view, with the abutment anchor 92, an abutment shaft 94 and an abutment cannulation 96. Additional views of the abutment are shown in FIGS. 10, 11 and 12, with abutments 100, 110 and 120, abutment anchor 102 and 122, abutment crown end 112, abutment cannulations 114 and 124 and abutment anchor threads 116 and 126. In order to assemble the implant and its cooperating abutment, the abutment anchor 102, 122 is inserted into the collar recess 18, 32 and the implant and abutment are secured with an internal set screw as described above. Referring now to FIG. 13, the dental implant abutment assembly 130 is shown in exploded perspective view, with the assembly of the dental implant 131, the abutment 132 the set screw 133 being very apparent from the drawing. The assembled version of the same dental implant abutment assembly 140 is shown in FIG. 14, with its respective dental implant 141 and abutment 142 being held together by the cooperating set screw. In operation the threads of the set screw tighten together with the implant cannulation threads 36 of FIG. 3 to secure, mechanically, the abutment into position adjacent the implant. The assembled unit appears in FIG. 15, with its dental implant 152, abutment 153 and set screw 154. The free end of the abutment is a standard design, intended to bear a crown or artificial tooth or to engage with other prostheses such as without limitation bridges or permanent denture structures. Whereas the free end of the abutment is a standard design, the interconnecting/interlocking end of the abutment must of course be compatible with the implant itself, including cooperating hex or Hexalobe or other interconnection shapes as applicable.

It is important that the present invention, while a thoroughly innovating concept in orienting dental implants, still provides for an ultimate assembly to which conventional crowns and artificial teeth may be affixed.

An example is provided by way of a protocol.

Example 1

1) Select the Positioning Implant Explorer, PIE, (diameter and length) that is indicated for the permanent implant (bone or dental) you plan to use. 2) With a dental handpiece compatible with the end shape of PIE, drive PIE into the host bone while maintaining the desired orientation. 3) Make sure the leading tip of PIE penetrates deep enough into the bone. 4) Visually examine the resultant alignment of PIE, angulation and position, or through a cannulated mock prosthesis placed over it, realizing that the final implant is wider than PIE itself. This is done with a C-arm or x-ray imaging. 5) If PIE orientation and position are unacceptable, remove it and then drive it in a better location and angulation. In such cases, it may be necessary to advance PIE deeper into the bone in order to engage it into solid bone. 6) If the bone is particularly hard (practitioner's evaluation), over-drilling may be called for. Alternatively, because the upper jawbone density is less than the lower jawbone, the practitioner may opt to forgo over-drilling if the implant is intended for the lower jawbone. When over-drilling is necessary, a cannulated drill with a diameter equal to the minor thread diameter of the implant and cannulation matching that of the PIE should be used. Drill the bone to the desired depth, but not past the threads of the PIE already embedded. 7) Retract the drill while leaving PIE in place, 8) Slide the implant until its tip reaches the host bone surface. 9) Using a cannulated screwdriver that matches the head cavity of the implant—hex, Hexalobe (shown) or other shape—slide the screwdriver over PIE and engage the implant head. 10) Screw the implant in place utilizing the self-tapping feature of the implant. 11) Once the implant is seated, retract the screwdriver and then PIE. 12) Screw in a cap or an abutment as appropriate. NOTE: If the bone is soft, eliminate Steps 6) and 7) and, instead, utilizing the self-drilling feature of the cutting tip of the implant, drill and self-tap in one step, over the PIE, using a screwdriver. THE POSITION IMPLANT EXPLORER IS THERE FROM BEGINNING TO END. THERE IS NO DRILLING OF THE BONE BEFORE IMPLANTING PIE. VIEW PIE AS YOUR RAILROAD TRACKS. ONCE YOU LAY THE TRACKS, THE PATH IS DEFINED. LAY THE TRACKS FIRST.

Figure 17:
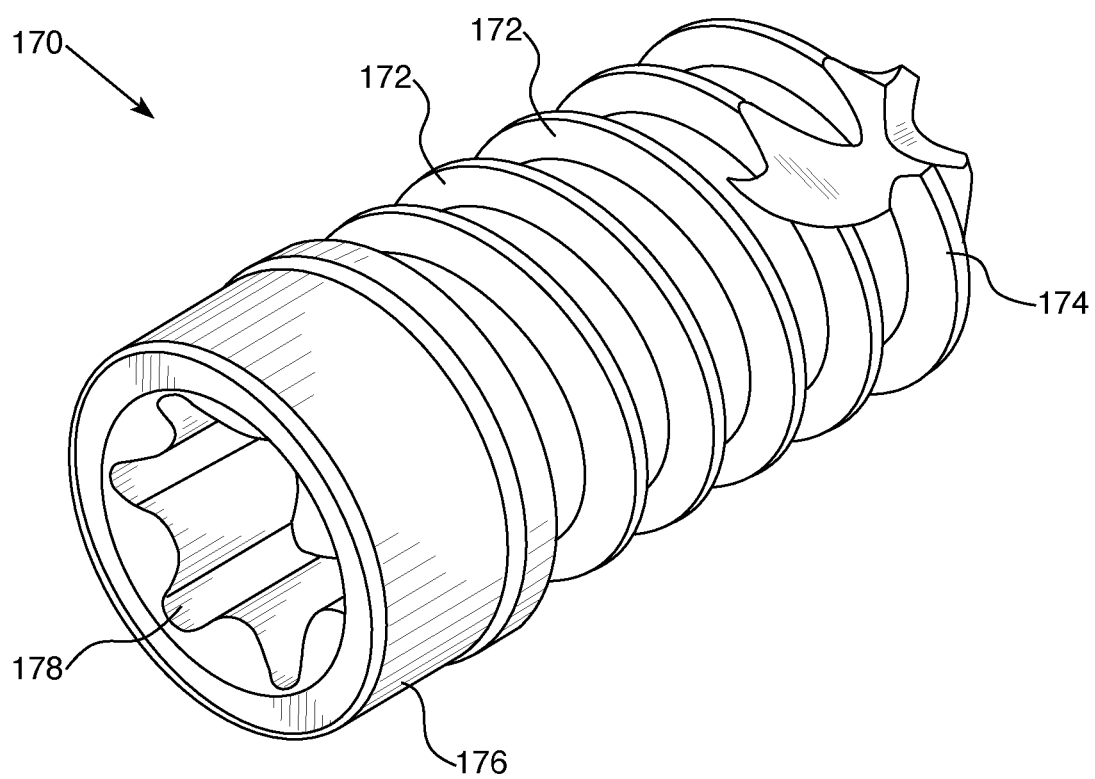
FIG. 17 is a perspective view of a main body of a cylindrical (not tapered) dental implant, with constant difference between outer and inner thread diameter as well as cutting threads at its distal tip.

Additional features of the Figures are explained as follows. In FIG. 10, analogously to FIG. 9, an abutment shaft 104 is positioned centrally to the abutment 100. Also, in FIG. 17, as described above the dental implant of FIG. 17 is cylindrical, but is otherwise analogous to FIG. 1 and contains analogous components therein. Referring again to FIG. 17, the present dental implant 170 bears cutting threads 172 thereon, with a chamfer 174 in said cutting threads. The end of the implant 170 opposite the cutting threads is a collar 176 having a collar recess 178. The collar recess has a geometric shape to which a rotating tool (not shown) can engage, and the implant as shown can be seen as cannulated. From these and the above description of the invention, those skilled in the art will perceive improvements, changes and modifications. It will be appreciated that separate steps of the present invention can be performed by separate dental practitioners. For example, an implant body 10 can be securely implanted within the jaw bone of a subject by an oral surgeon. The subject can then be seen by a general dentist to complete the method of the present invention and provide the subject with a dental implant 10. Such improvements, changes and modifications are within the skill of the art and are intended to be covered by the appended claims.

I claim:

1. A dental implant system comprising:
   a dental implant;
   a removable position implant explorer, comprising a slender post having a post shaft and a post distal cutting tip that tapers distally to a sharp point and contains threads proximally adjacent to said post distal cutting tip,
   wherein said slender post has a constant diameter from its proximal end to said threads and further is configured to engage to a driver tool at its proximal end and also is configured to contact the jawbone at its distal end as a pre-drill configured for insertion and removal, thereby facilitating the position and orientation of said dental implant during implantation;
   further wherein said dental implant has a single cannulation therein, wherein said cannulation extends the entire length of said dental implant as a cannulated shaft, wherein said cannulated shaft is configured to receive said position implant explorer throughout the entire length of said cannulated shaft throughout said single cannulation which extends the entire length of said dental implant,
   said dental implant having an exterior diameter and further comprising an outer shaft having a shaft end bearing cutting threads on the exterior thereof, said outer shaft having a distal shaft and a proximal shaft, said cutting threads having a chamfer, wherein said proximal shaft has a proximal collar having a proximal collar recess and further wherein said cutting threads end with said chamfer groove at a shaft tip;
   and further wherein said cannulated shaft extends from said proximal collar to and through said shaft tip and further wherein said cannulated shaft surrounds throughout its length said removable position implant explorer;
   an abutment containing an abutment cannulation configured to engage a coronal portion of and to attach to said dental implant with a set screw that fills said abutment cannulation upon affixation of said abutment and said set screw, with said set screw being configured to hold said abutment in place on said coronal portion of said dental implant, wherein said slender post of said position implant explorer has a diameter of ⅓ to ⅕ of said external diameter of said dental implant; and wherein upon positioning of said position implant explorer and said dental implant, said dental implant adopts the same orientation as said position implant explorer.

2. The dental implant system of claim 1, wherein said cannulated shaft has interior cannulation threads on a segment of an inner surface of said cannulated shaft.

3. The dental implant system of claim 2, wherein said set screw bears threads which mate with said interior cannulation threads.

4. The dental implant system of claim 2 wherein said set screw has a distal end sized to mate with and partially or totally fill a distal end of said cannulated shaft.

5. The dental implant system of claim 2, wherein said abutment fits via an abutment anchor into said proximal collar recess and said set screw secures said abutment to said implant.

6. The dental implant system of claim 2, wherein said proximal shaft has a proximal end and said proximal end is shaped to mate with conventional dental hand pieces either directly or through an adapter to conform to dental hand pieces.

7. The dental implant system of claim 2, further wherein said abutment comprises a cannulated abutment and said set screw comprises a threaded set screw.

\* \* \* \* \*